Oct. 18, 1938.    F. W. GODSEY, JR    2,133,744
ELECTRICAL CONDENSER
Filed Jan. 17, 1936
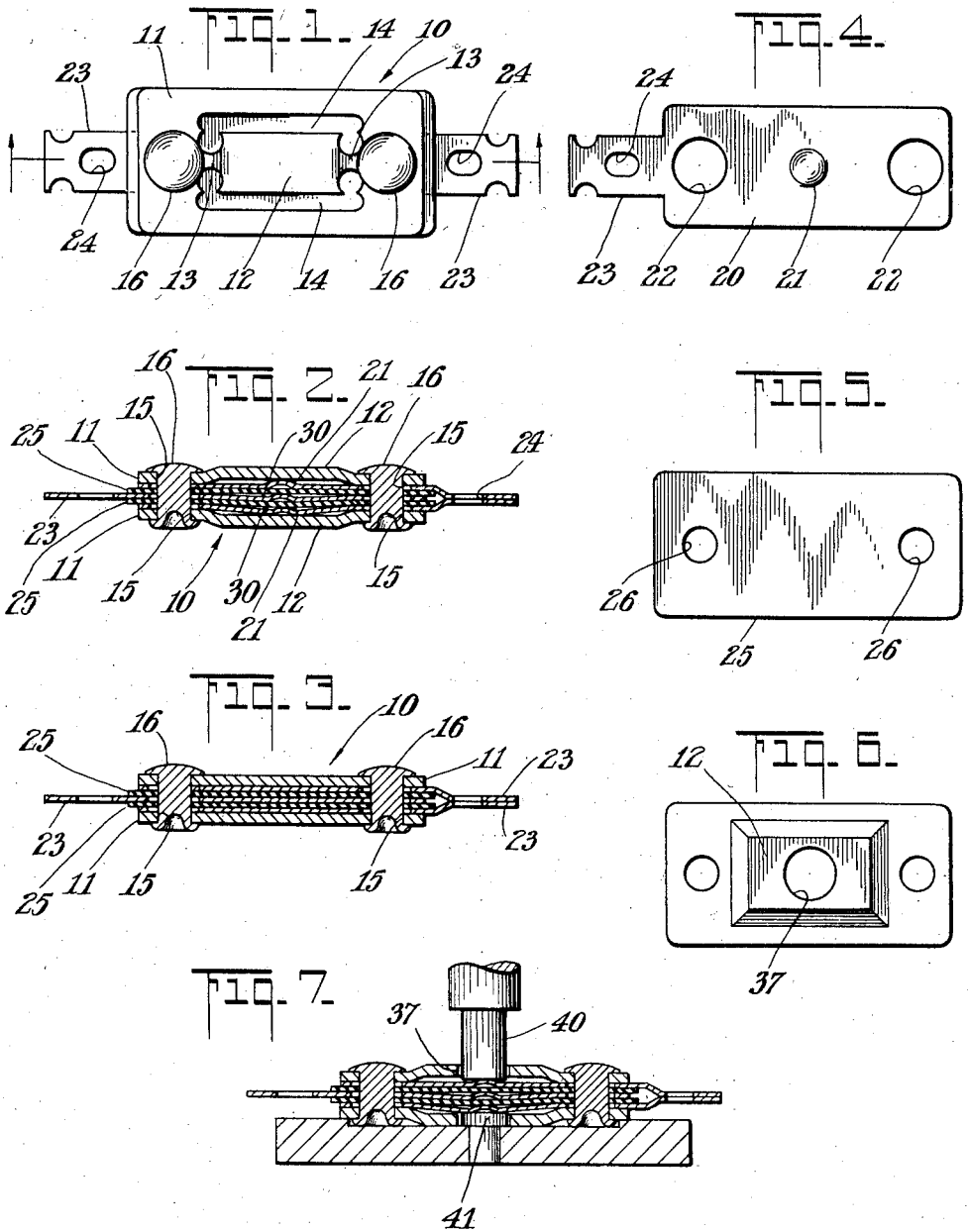
INVENTOR.
FRANK W. GODSEY JR
BY
Dorsey & Cole
ATTORNEYS Patented Oct. 18, 1938

2,133,744

UNITED STATES PATENT OFFICE 2,133,744

ELECTRICAL CONDENSER

Frank W. Godsey, Jr., North Adams, Mass., assignor to Sprague Specialties Company, North Adams, Mass., a corporation of Massachusetts Application January 17, 1936, Serial No. 59,615

6 Claims. (Cl. 175—41)

My invention relates to improvements in electrical condensers, and especially to the construction of fixed-capacity electrical condensers, and means whereby close adjustment of the condenser capacity to a predetermined value is easily and simply attained.

In the manufacture of fixed-capacity condensers, especially for very small capacities, variations in the effective area of the armatures, in the thickness of the dielectric layers, etc., which are impossible—or at least very costly—to avoid, may cause a large percentage difference between the individual capacities of a batch of supposedly identical condensers. On the other hand, in many uses of these condensers, it is imperative that the capacity of the condenser is accurate within narrow tolerances.

My invention provides for simple and inexpensive means, which make it possible to manufacture fixed condensers, even of very small capacities, for example of 0.0001 microfarad, whereby the capacities of the finished condensers are within 1% of the desired value.

My invention will be described with reference to the accompanying drawing, in which:

Figure 1 is a plan view on an enlarged scale of a small-capacity condenser made according to my invention;

Fig. 2 is a longitudinal section taken on the lines 2—2 of Fig. 1, showing the condenser before adjustment;

Fig. 3 is a similar section to Fig. 2, showing the condenser adjusted for a maximum capacity;

Fig. 4 is a plan view of a condenser armature plate;

Fig. 5 is a plan view of an insulating plate;

Fig. 6 is a plan view of the top plate of a condenser made according to another form of my invention;

Fig. 7 is a longitudinal cross-section of the condenser using the top plate of Fig. 6 and the adjusting means.

Referring to Figs. 1 and 2, the condenser assembly A in its preferred embodiment comprises two end-plates 11—11, preferably of identical construction, each of which is provided with a central rectangular portion 12 integral with an outer frame portion of the plate 11 and connected thereto by narrow neck portions 13—13 at the midpoints of the shorter sides. The rectangular portion 12 is formed by stamping same from the plate to leave slot-like openings 14—14 along the longer sides and also partly across the shorter sides of the plate. The plates 11—11 are so deformed that the portions 12—12 are offset from the plane of the plates for a purpose later described.

The end portions of the plate 11 are provided with round apertures 15 adapted to receive rivets 16 or other suitable fastening means.

The condenser-assembly is built up of alternate layers of rectangular armature plates 20 of conductive material (see Fig. 4) and of insulating plates 25 (see Fig. 5).

Each plate 20 is provided with a raised central portion 21 provided preferably in the center of the effective portion of the armature. The plate 20 also has two apertures 22—22 through which the rivet 16 may pass and the diameter of which apertures is sufficiently large to leave clearance around the rivet. Each plate is further provided at one end with an extension or lug 23 having a hole 24. The armatures 20 are preferably made of soft and non-resilient materials such as copper, soft brass, etc., which upon exertion of pressure on same are permanently deformed and do not change because of resiliency of the material.

The insulator plates 25 are preferably made from mica although other suitable dielectric materials may be used, for example impregnated paper, layers of dielectric compounds, etc. The insulator plates 25 are rectangular in shape and slightly longer and wider than the armature plates 20, and have holes 26, which align with the holes 15 and 22; however their diameter is such as to snugly receive the rivets 16.

To assemble a condenser the armature plates 20 and insulator plates 25 are alternately stacked, preferably in such a manner that two armature plates form the outside layers and that the lug 23 of successive armature plates extend to the opposite side of the stack. Thereby, for example, in case of three armature plates and two insulating plates, as shown in Fig. 2, the end plates 11—11 contact with the adjacent armature plates, which are shown as having their lugs 23 extending to the right, whereas the inner armature plate 20, which has its lug extending to the left, is insulated from the outer armature plates and also from the end plates 11—11 by the interposed mica plates 25—25. It should be well understood that the same general principle applies with regard to armature plates of opposite polarity, when more than three armature plates are used in the stack.

When the stack is thus assembled, as shown in Fig. 2, and the end plates 11—11 riveted together by rivets 16—16 to enclose the same and to form a compact unit, there exist between successive layers of the condenser-assembly air spaces due to the raised portions 21 of the armature plates 20, which air spaces cause the condenser capacity to be considerably smaller than its intended final capacity.

To obtain the desired final capacity with a great degree of accuracy, the condenser assembly shown in Fig. 2 is subjected to compression, for example, by inserting same in a suitable press. Thereby the pressure exerted on the two end plates 11—11 causes their flattening out and the consequent flattening of the raised portions 21 of the armature plates. This reduces the air spaces between the successive layers and correspondingly increases the capacity of the condenser. The compression is carried to a point at which the capacity of the condenser assumes the exact desired value or at least a value which falls within very narrow selected limits; the value of the condenser capacity being ascertained by connecting the condenser by means of the lugs 23—23 (or by means of lead wires secured thereto) to a suitable capacity-measuring instrument.

Figure 3 shows the condenser when compressed to its maximum capacity value, which value is considerably in excess of the desired capacity value. Thus, for a batch of condensers manufactured according to a given specification, the lowest capacity of the condensers, i. e., before they are compressed (Fig. 2), and the largest capacity obtained, i. e., fully compressed (Fig. 3), should give capacity limits within which any condenser of the batch can be exactly adjusted to the desired capacity by compressing it to an intermediate state, and this in spite of the unavoidable variations in thickness of the dielectric layers, area of the armatures, etc. of the condensers.

The material of the plates 11 is preferably soft or half hard steel and of the armatures 20, as stated, copper or soft brass, whereby the compression may be carried to any desired degree without any further change in the condenser capacity after the pressure has been removed.

It should be also noted that the end plates 11 form a continuous surface around the edges of the condenser stack, holding the armatures and insulating plates tightly clamped around their edges.

Instead of offsetting the end plates 11, as described in connection with the previous embodiment, the end plates may be provided with a central grill-work, or again, a single hole may be provided in the central portion 12 of the plates 11. In either case adjustment of the condenser capacity can be made by pushing suitable blunt tools through holes of the grill-work or through one central hole, to flatten the raised portions 21 of the armature plates.

This is shown in Figs. 6 and 7, in which the condenser structure in general is identical with that shown in Figs. 1 to 5, except that the offset portions of the end plates are provided with holes 37 through which suitable tools, as indicated in Fig. 7 by a punch 40 and an anvil 41, can be pressed against the armature 20 to cause the flattening out of their raised portions 21.

While I have described my invention in connection with specific examples and in specific applications, I do not wish to be limited thereto, but desire the appended claims to be construed as broadly as permissible in view of the prior art.

What I claim is:

1. An electrical condenser comprising, a stack of alternate layers of conducting and insulating plates, each of said conducting plates being provided with one central raised portion to form air spaces between the layers, and means to compress and permanently deform at least partly said raised portions to decrease the air spaces and to adjust the condenser to a fixed and exact capacity value.

2. An electrical condenser comprising armatures of conducting material, and a dielectric layer interposed between said armatures, said armatures having centrally-raised portions, end plates for said condenser having offset portions pressing against the outer armatures, compression of said offset portion causing corresponding compression of said raised portions and an increase of the capacity of the condenser.

3. A condenser comprising a stack of alternate layers of conductive plates and insulating plates, said conductive plates having raised portions, end plates to enclose said condenser stack, said end plates having apertures adapted to receive a tool for the compression of said raised portions.

4. A small-capacity fixed condenser comprising, a stack of armature plates and mica plates alternating with each other, said armature plates being of soft metal and having central raised portions to form air spaces in the stack, end-plates clamped to said stack, said end-plates being of semi-soft, non-resilient metal and tightly engaging the stack at the edges thereof, and means centrally disposed on said end-plates to permit compression of said raised portions and increase the capacity of the condenser.

5. A small-capacity fixed condenser comprising a stack of conductive plates and dielectric plates alternating with each other, said conductive plates being of non-resilient material and having central raised portions to form air spaces in the stack, end plates clamped to said stack and partly engaging the stack at the edges thereof, said raised portions being compressible from the outside of the end plates to decrease the air spaces and to permanently adjust the condenser to a fixed and exact capacity value.

6. An electrical condenser comprising a stack of alternate layers of conducting and insulating plates, said conducting plates being provided with raised and permanently deformable portions to distance said plates, said raised portions on compression being deformed to decrease the distance between said plates and to permanently adjust the condenser to a fixed and exact capacity value.

FRANK W. GODSEY, Jr.